(12) United States Patent
Tanaami et al.

(10) Patent No.: US 7,789,270 B2
(45) Date of Patent: Sep. 7, 2010

(54) CHEMICAL REACTION CARTRIDGE AND METHOD USING SAME

(75) Inventors: Takeo Tanaami, Musashino (JP); Hidetoshi Aoki, Musashino (JP); Saya Satou, Musashino (JP); Takeyuki Mogi, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 978 days.

(21) Appl. No.: 11/524,948

(22) Filed: Sep. 22, 2006

(65) Prior Publication Data

US 2007/0068964 A1 Mar. 29, 2007

(30) Foreign Application Priority Data

Sep. 27, 2005 (JP) ............................. 2005-279505

(51) Int. Cl.
*B65D 35/22* (2006.01)
(52) U.S. Cl. ......................................... 222/94; 206/219
(58) Field of Classification Search ................... 222/94, 222/97, 98, 101, 106, 107, 213–215, 136, 222/145.4, 145.6; 206/219–222, 484, 484.1, 206/484.2; 422/88, 99–103
See application file for complete search history.

(56) References Cited

U.S. PATENT DOCUMENTS 4,331,264 A * 5/1982 Staar ............................ 222/94

(Continued)

FOREIGN PATENT DOCUMENTS

DE 196 04 289 A1 8/1997

(Continued)

OTHER PUBLICATIONS

European Search Report dated Mar. 5, 2007, issued in corresponding European patent application No. 06018888.5.

(Continued)

*Primary Examiner*—Lien T Ngo
(74) *Attorney, Agent, or Firm*—Westerman, Hattori, Daniels & Adrian, LLP (57) ABSTRACT

A chemical reaction cartridge enabling chemical reaction to be stably and safely carried out therein, and a method of using the same are provided. A chemical reaction cartridge is provided with a substrate, and an elastic member 2 overlaid on the substrate. A recess of a predetermined shape, depressed toward the top surface of the elastic member is formed in the back surface of the elastic member. The recess creates space between the substrate, and the elastic member, thereby making up a well, for holding the main ingredient of the epoxy adhesive, a flow path communicating with the well, a well for holding a curing agent for the epoxy adhesive, a flow path communicating with the well, a mixing part for mixing the main ingredient with the curing agent, and a discharge path for discharging a mixture. While the chemical reaction cartridge is not in use as yet, the flow paths, and the discharge path are closed, so that the wells are, in effect, in a hermetically sealed condition. The mixing part is made up of a plurality of flow paths intersecting each other. The respective starting ends of the flow paths are each linked with the flow path, or the flow path, and the respective terminals of the flow paths are linked with the discharge path. The terminal of the discharge path communicates with the outside via an end face of the cartridge.

23 Claims, 8 Drawing Sheets

U.S. PATENT DOCUMENTS

| | | | |
|---|---|---|---|
| 4,952,068 A * | 8/1990 | Flint | 366/337 |
| 5,290,518 A * | 3/1994 | Johnson | 422/58 |
| 5,462,526 A * | 10/1995 | Barney et al. | 604/85 |
| 5,472,671 A * | 12/1995 | Nilsson et al. | 422/102 |
| 5,674,653 A | 10/1997 | Chemelli et al. | |
| 5,775,805 A * | 7/1998 | Furuya | 366/130 |
| 6,135,632 A * | 10/2000 | Flint | 366/340 |
| 6,612,769 B2 * | 9/2003 | Lee et al. | 401/183 |
| 7,056,475 B2 * | 6/2006 | Lum et al. | 422/100 |
| 7,207,970 B2 * | 4/2007 | Hasegawa | 604/90 |
| 7,284,902 B2 * | 10/2007 | Hosozawa | 366/336 |
| 7,320,398 B2 * | 1/2008 | Bertl et al. | 206/229 |
| 2004/0065679 A1 * | 4/2004 | Peuker et al. | 222/107 |
| 2004/0254559 A1 | 12/2004 | Tanaami et al. | |

FOREIGN PATENT DOCUMENTS

| | | | |
|---|---|---|---|
| DE | 10 2005 019 195 A1 | 12/2005 | |
| EP | 1 279 436 A2 | 1/2003 | |
| EP | 1 743 699 A1 | 1/2007 | |
| GB | 1 205 210 A | 9/1970 | |
| GB | 2 405 182 A | 2/2005 | |
| JP | 2004294417 | * 10/2004 | 222/94 |
| JP | 2005-037368 A | 2/2005 | |
| WO | WO 03/015923 A1 | 2/2003 | |

OTHER PUBLICATIONS

European Search Report dated Mar. 26, 2008, issued in corresponding European Patent Application No. 08001244.

* cited by examiner

CHEMICAL REACTION CARTRIDGE AND METHOD USING SAME

FIELD OF THE INVENTION

The invention relates to a chemical reaction cartridge capable of causing deformation to occur thereto upon application of an external force thereto, and transferring substances contained therein to thereby apply a chemical reaction, and a method of using the same.

BACKGROUND OF THE INVENTION

In the case of preparing, for example, a two-liquid curing-type epoxy resin, two liquids are normally mixed together manually if a quantity involved is small. In the case of using a large quantity of the epoxy resin, a dedicated mixer is used. Meanwhile, there has been disclosed a closed-type chemical reaction cartridge wherein deformation is caused to occur thereto upon application of an external force thereto, thereby causing liquids contained therein to be transferred so as to undergo chemical reaction for inspection of a sample (refer to, for example, Patent Document 1).

[Patent Document 1] JP 2005-37368 A

SUMMARY OF THE INVENTION

In the case of preparing a two-liquid curing-type epoxy resin, however, a manual mixing operation takes long time, and there occurs large variation in workmanship. Particularly, in the case of a ratio of a curing agent to the main ingredient being low, it will be difficult to achieve satisfactory mixing. Further, if a quantity of a reagent to be prepared is small, mixing by use of a mixer is wasteful, and operations for replacement of substances contained in a cartridge, and cleaning of the cartridge will impose an additional burden on workers.

Further, as is often the case, in the course of various chemical reactions, evolution of noxious gasses occurs, and it is necessary to handle substances which contact with skin is to be avoided, so that it is difficult to ensure work safety.

It is therefore an object of the invention to provide a chemical reaction cartridge enabling chemical reaction to be stably and safely carried out therein, and a method of using the same. More specifically, with the cartridge according to the invention, it is not a case where a specific sample is injected therein from outside when the cartridge is put to use before carrying out inspection of the sample inside the cartridge, but the invention provides the cartridge that is an intelligent container having a mixing function for mixing a plurality of substances contained therein beforehand with each other at the time when the cartridge is put to use before discharging, and a method of using the same.

In accordance with one aspect of the invention, there is provided a chemical reaction cartridge capable of causing deformation to occur thereto upon application of an external force thereto, and transferring substances contained therein to thereby apply a chemical reaction, the cartridge comprising a plurality of holding parts for holding the substances in a hermetically sealed condition, a mixing part for mixing the substances with each other in accordance with the deformation of the cartridge, and a discharge part for discharging a mixture produced in the mixing part to the outside of the cartridge, in accordance with the deformation of the cartridge.

With the chemical reaction cartridge according to the invention, since there are provided the mixing part for mixing the substances contained therein with each other in accordance with the deformation of the cartridge, and the discharge part for discharging the mixture produced in the mixing part to the outside of the cartridge, in accordance with the deformation of the cartridge, mixing and discharging processes can be rapidly and stably carried out. Further, since the substances contained therein are held in the hermetically sealed condition, it is possible to ensure safety prior to, and at the time of usage of the cartridge.

The mixing part may have a plurality of intersections where the substances contained cross each other.

The mixing part may comprise a plurality of wells, and flow paths interconnecting the wells, respectively.

The mixing part may be made up by use of beads or a mesh filter, held in the cartridge.

By causing the deformation of the cartridge to occur upon application of the external force thereto, thereby transferring the substances contained in the cartridge, in one direction, mixing and discharging of the substances contained may be carried out.

In this case, a series of processes can be executed by a simple operation.

The chemical reaction cartridge according to the invention may comprise a first mixing part for mixing first and second substances contained in the cartridge, respectively, in a hermetically sealed condition, with each other, in accordance with deformation of the cartridge, and a second mixing part for mixing a mixture produced in the first mixing part with a third substance contained in the cartridge, in a hermetically sealed condition, in accordance with the deformation of the cartridge.

In this case, mixing in multi-stages can be carried out.

In accordance with another aspect of the invention, there is provided a method of using a chemical reaction cartridge, said method comprising the step of providing the chemical reaction cartridge capable of causing deformation to occur thereto upon application of an external force thereto, and transferring substances contained therein, with a plurality of holding parts for holding the substances in a hermetically sealed condition, a mixing part for mixing the substances with each other in accordance with the deformation of the cartridge, and a discharge part for discharging a mixture produced in the mixing part to the outside of the cartridge, in accordance with the deformation of the cartridge, so as to keep the cartridge in a state where the substances are held in the respective holding parts, and the step of applying the external force to the cartridge, and the step of mixing the substances held in the respective holding parts before discharging.

With the method of using the chemical reaction cartridge, according to the invention, since the cartridge is kept in the state where the substances are held in the respective holding parts, and mixing of the substances held in the respective holding parts is executed before discharging by applying the external force to the cartridge, a predetermined chemical reaction can be safely and stably carried out.

The method of using the chemical reaction cartridge, according to the invention, may further comprise the step of disposing of the cartridge after the step of mixing the substances held in the respective holding parts before discharging.

In such a case, safety after usage of the cartridge can be ensured, and operations for cleaning, and so forth become unnecessary.

In the step of mixing the substances held in the respective holding parts before discharging, make up fresh when the cartridge is put to use may be carried out.

In the step of mixing the substances held in the respective holding parts before discharging, chemical reaction on the substances may be started or promoted.

In the step of mixing the substances held in the respective holding parts before discharging, the substances may be brought into contact with catalysts.

In the step of mixing the substances held in the respective holding parts before discharging, enzyme and substrate as the substances, respectively, may be brought into contact with each other.

In the step of mixing the substances held in the respective holding parts before discharging, a detection medicine may be prepared.

In the step of mixing the substances held in the respective holding parts before discharging, a reagent for cell culture chamber may be prepared.

The cartridge may be provided with a culture chamber for cells or bacteria, serving as one of the holding parts, and substances in the cells or bacteria may be extracted in the step of mixing the substances held in the respective holding parts before discharging.

A reagent made up fresh when the cartridge is put to use may be a mixture of a monomer and a polymerization initiator, a mixture of a monomer and a polymerization promoter, or a therapeutic reagent.

The monomer described as above may be acrylamide.

The reagent made up fresh when the cartridge is put to use may be a reagent having toxicity, hazards, explosiveness, or carcinogenicity.

The reagent having carcinogenicity may be a Western blotting detection liquid.

The reagent having explosiveness may be a silver staining liquid.

The detection medicine may be a cyanide detection reagent, or an acid phosphatase detection reagent.

The invention further provides a chemical reaction cartridge capable of causing deformation to occur thereto upon application of an external force thereto, and transferring substances contained therein to thereby apply a chemical reaction, the cartridge comprising a plurality of holding parts for holding the substances therein, respectively, and a discharge part for discharging a mixture of the substances to the outside of the cartridge, in accordance with the deformation of the cartridge, wherein the substances each are a fluid and fine particles, and the mixture of the fluid and the fine particles is discharged from the discharge part.

With the chemical reaction cartridge described as above, a discharging process can be rapidly, and stably executed after mixing the fine particles with the fluid.

The fluid may be transferred so as to enter one of holding parts, for holding the fine particles, to be thereby mixed together.

With the chemical reaction cartridge according to the invention, there are provided the mixing part for mixing the substances with each other in accordance with the deformation of the cartridge, and the discharge part for discharging the mixture produced in the mixing part to the outside of the cartridge, in accordance with the deformation of the cartridge, so that mixing and discharging processes can be rapidly and stably carried out. Further, since the substances contained therein are held in the hermetically sealed condition, safety prior to, and at the time of usage of the cartridge can be ensured.

Yet further, the chemical reaction cartridge according to the invention is made up such that the mixture of the fluid and the fine particles is discharged from the discharge part even though the substances each are the fluid and the fine particles, so that the discharging process can be rapidly, and stably executed after mixing the fine particles with the fluid.

With the method of using the chemical reaction cartridge, according to the invention, the cartridge is kept in the state where the substances are held in the respective holding parts, and mixing and discharging are carried out by applying the external force to the cartridge, so that a predetermined chemical reaction can be safely and stably carried out.

BRIEF DESCRIPTION OF THE DRAWINGS

FIG. 1 is a view showing a construction of a chemical reaction cartridge according to one of working examples of the invention, in which FIG. 1(A) is a plan view showing the construction of the chemical reaction cartridge, FIG. 1(B) is a sectional view taken on line 1b-1b in FIG. 1(A), and FIG. 1(C) is a partially enlarged view of a mixing part of the chemical reaction cartridge;

FIG. 2 is a view showing a method of using the cartridge, in which FIG. 2(A) shows a state where a roller is rotated while pressed into contact with the cartridge, and FIG. 2(B) shows a state where a roller is further rotated;

FIG. 3 is a view showing a construction of another working example of the chemical reaction cartridge according to the invention, in which FIG. 3(A) is a view showing a case where three wells are formed in the cartridge, and FIG. 3(B) is a view showing a case where three substances held in three wells, respectively, are mixed in orderly sequence as predetermined:

FIG. 4 is a view showing a construction of a mixing part by way of example, in which FIG. 4(A) is a view showing a case where baffles are provided, FIG. 4(B) is a plan view showing a construction where wells and flow paths are alternately linked with each other, respectively, and FIG. 4(C) is a sectional view taken on line IVc-IVc of FIG. 4(B);

FIG. 5 is a view showing a construction of another mixing part by way of example, in which FIG. 5(A) is a view showing a case where a mixing part is made up in the form of a mesh of flow paths, and FIG. 5(B) is a view showing a case where mixing is executed by use of beads or a mesh filter;

FIG. 6 is a view showing substances held in wells, respectively, by way of example, in which FIG. 6(A) is a view showing a case where fine particles are held in one of wells, and FIG. 6(B) is a view showing a case where catalysts are held in one of wells;

FIG. 7 is a view showing a case of making proper use of substances contained by way of example, in which FIG. 7(A) is a view showing a case where a usable quantity of the substances held in wells can be adjusted, and FIG. 7(B) is a view showing a case where a plurality of wells are installing in a direction orthogonal to a drive direction of a roller; and FIG. 8 is a view showing a construction of still another working example of the chemical reaction cartridge according to the invention, in which FIG. 8(A) is a view showing a case where a cell culture chamber is formed inside the cartridge, and FIG. 8(B) is a view showing a case of executing a multistage mixing

PREFERRED EMBODIMENTS OF THE INVENTION

Referring to FIGS. 1 to 8, working examples of a chemical reaction cartridge according to the invention are described hereinafter. The working examples represent a case where the chemical reaction cartridge according to the invention is used as a container of an epoxy adhesive.

FIG. 1(A) is a plan view showing a construction of the chemical reaction cartridge according to one of the working examples, FIG. 1(B) is a sectional view taken on line 1b-1b in FIG. 1(A), and FIG. 1(C) is a partially enlarged view of a mixing part of the chemical reaction cartridge.

Figure 1:
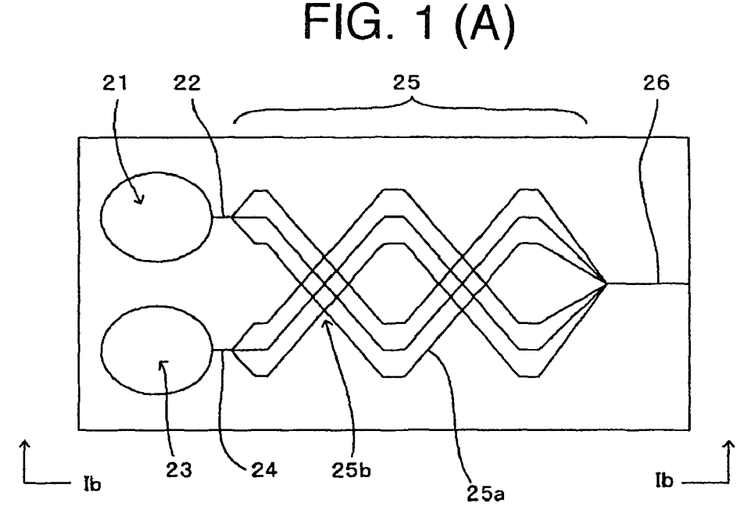

As shown in FIG. 1, the chemical reaction cartridge according to the present working example comprises a substrate 1, and an elastic member 2 overlaid on the substrate 1.

A recess of a predetermined shape, depressed toward the top surface of the elastic member 2 (an upper surface thereof, in FIG. 1(B)) is formed in the back surface of the elastic member 2 (the underside surface thereof, in FIG. 1(B)). The recess creates space between the substrate 1, and the elastic member 2, thereby making up a well 21 for holding the main ingredient of the epoxy adhesive, a flow path 22 communicating with the well 21, a well 23 for holding a curing agent for the epoxy adhesive, a flow path 24 communicating with the well 23, a mixing part 25 for mixing the main ingredient with the curing agent, and a discharge path 26 for discharging a mixture.

While the chemical reaction cartridge is not in use as yet, the flow paths 22, 24, and the discharge path 26 are closed, so that the wells 21, 23 are, in effect, in a hermetically sealed condition. In order to ensure the hermetically sealed condition, a valve for securing the hermetically sealed condition may be provided at a predetermined site of the chemical reaction cartridge, and the valve may be kept in a closed state while the cartridge is not in use as yet.

The mixing part 25 is made up of a plurality of flow paths 25a intersecting each other. The respective starting ends of the flow paths 25a are each linked with the flow path 22, or the flow path 24, and the respective terminals of the flow paths 25a are linked with the discharge path 26. FIG. 1(C) is a view showing a part of the mixing part 25, showing a manner in which the flow paths 25a are linked with each other at respective intersections 25b.

The terminal of the discharge path 26 communicates with the outside via an end face of the cartridge (the right-hand end face in FIG. 1(A))

Figure 2:
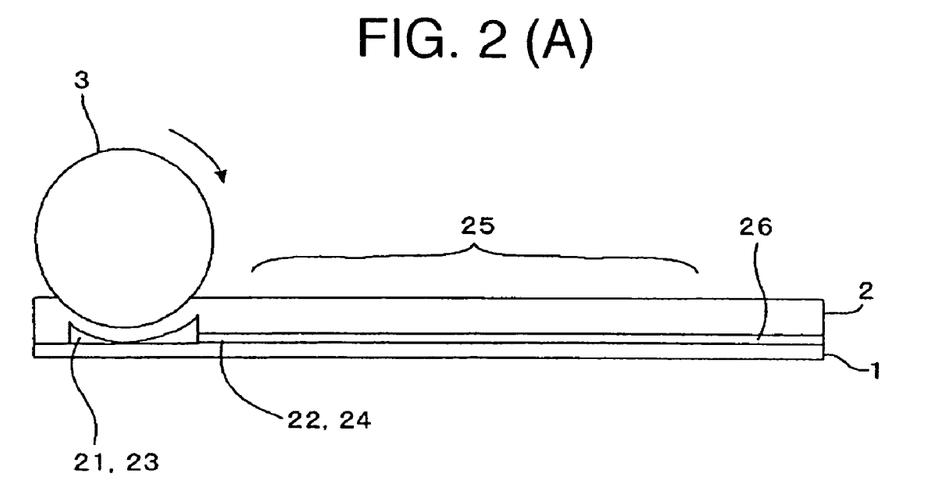

FIG. 2 is a view showing a method of using the cartridge.

As shown in FIG. 2(A), a roller 3 is rotated rightward while pressed into contact with the cartridge, whereupon the elastic member 2 undergoes elastic deformation to thereby cause the main ingredient held in the well 21, and the curing agent held in the well 23 to push and open the flow paths 22, 24, respectively, before reaching the mixing part 25.

As shown in FIG. 2(B), upon the roller 3 being further rotated, the main ingredient, and the curing agent proceed rightward in the respective flow paths 25a to be thereby mixed together at one of the intersections 25b. A mixture thus produced further proceeds in the respective flow paths 25a to be further evenly mixed at the other intersection 25b.

The mixture that has advanced as far as the discharge path 26 due to rotation of the roller 3 is in a state as sufficiently mixed, and is discharged from the end face of the cartridge.

Thus, with the cartridge according to the present working example, the main ingredient held in the well 21, and the curing agent held in the well 23 are mixed with each other in the process of both being transferred by the roller 3, so that the mixture in the state as sufficiently mixed is discharged. Consequently, processes for mixing and discharging can be automatically and stably executed, thereby eliminating the needs for a complex operation required by mixing. Further, even when a small quantity of an adhesive is prepared, no waste is generated, and there is no risk of the hands of a worker and a jig being soiled due to a mixing operation. Since the cartridge is a throwaway type, cleaning after the mixing operation is unnecessary. Further, since the main ingredient, and the curing agent can be mixed and discharged in short time, the cartridge is suitable for application to an adhesive high in curing rate. Furthermore, if the substrate 1 is formed of a hard material, the substrate 1 can be utilized for handling, and positioning.

The main ingredient, and the curing agent may be mixed with each other manually without the use of the roller to be subsequently discharged. In such a case, the cartridge in whole may be made up of an elastic member or a flexible member, and the main ingredient, and the curing agent may be squeezed out by rounding the cartridge to thereby cause the main ingredient, and the curing agent to be mixed with each other before discharging.

With the present working example of the invention, described as above, a case of preparing the adhesive is described by way of example, however, the cartridge according to the invention can be used in various applications. With the cartridge, it is also possible to prepare, for example, silicone rubber, urethane resin, acrylic resin, various inks, paints, and so forth. The substance contained in the cartridge is not limited to a liquid provided that the same has liquidity, and the substance may be gel, and so forth.

Figure 3:
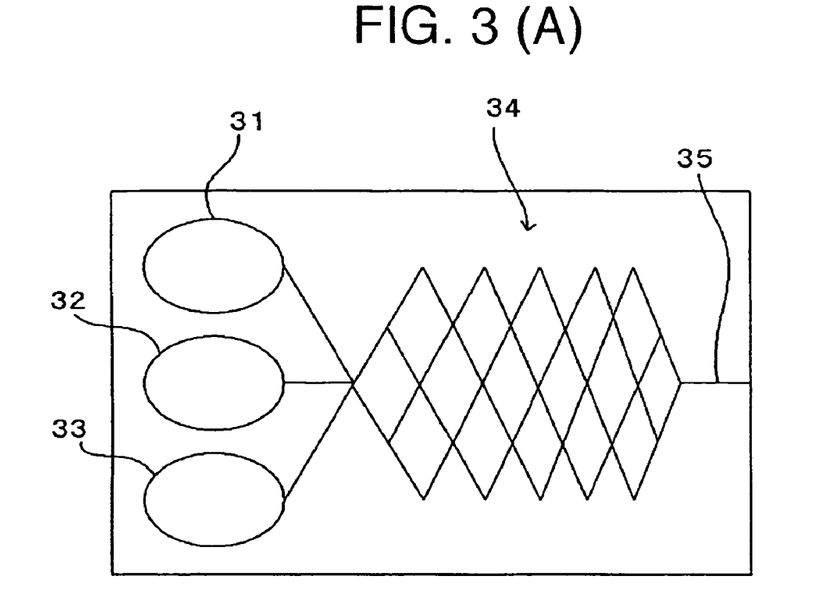

FIG. 3 shows a construction of another working example of the chemical reaction cartridge according to the invention.

The cartridge can contain three or more substances. With the cartridge according to the working example shown in FIG. 3(A), three wells 31, 32, 33 are formed, and three substances held in the three wells 31, 32, 33, respectively, are mixed together in a mixing part 34 to be discharged via a discharge path 35.

With the cartridge according to the working example shown in FIG. 3(B), there is shown a case where three substances held in three wells, respectively, are mixed in orderly sequence as predetermined. In this case, the substances held in wells 37, 38, respectively, are mixed with each other in a mixing part 40, and further, a mixture thus produced is mixed with a substance held in a well 39 in a mixing part 41. It is possible to cause mixing in the mixing part 41 to take place after the elapse of time necessary for chemical reaction to proceed after mixing in the mixing part 40.

Figure 4:
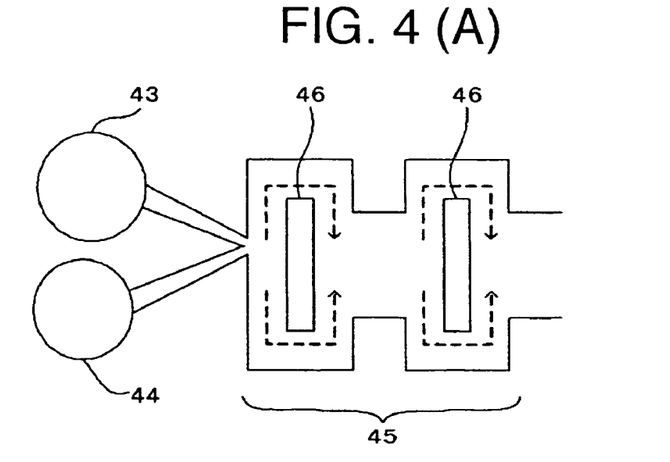
Figure 5:
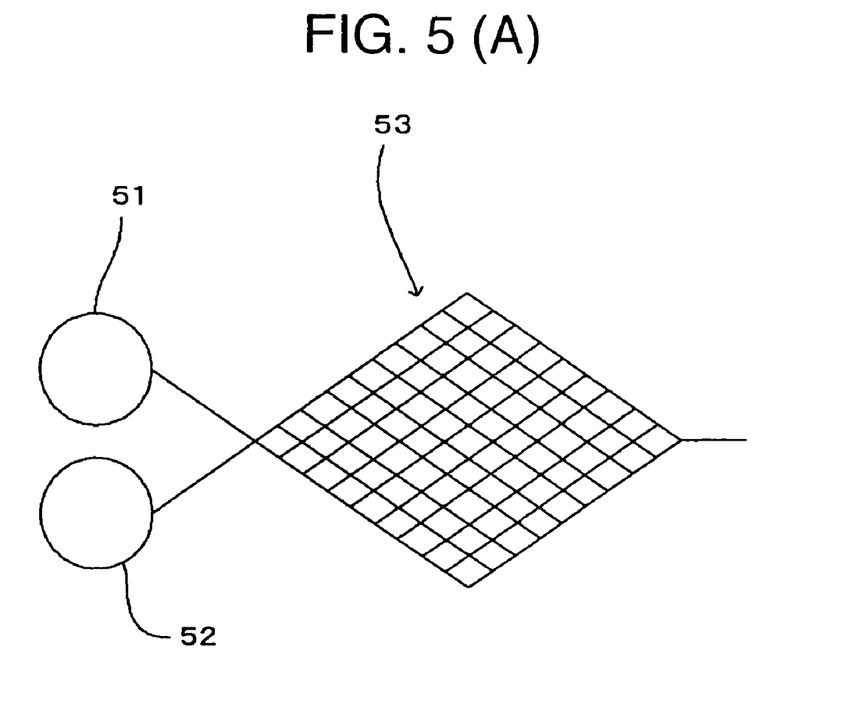
Figure 6:
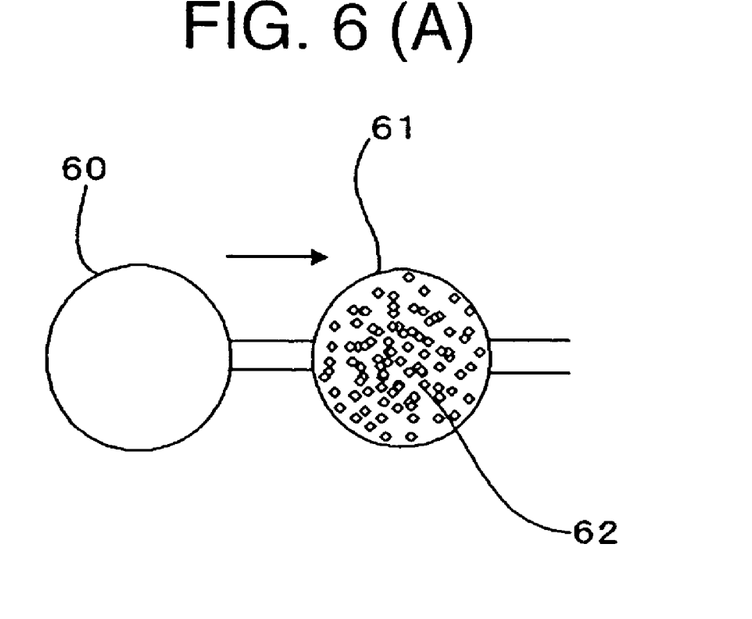
Figure 7:
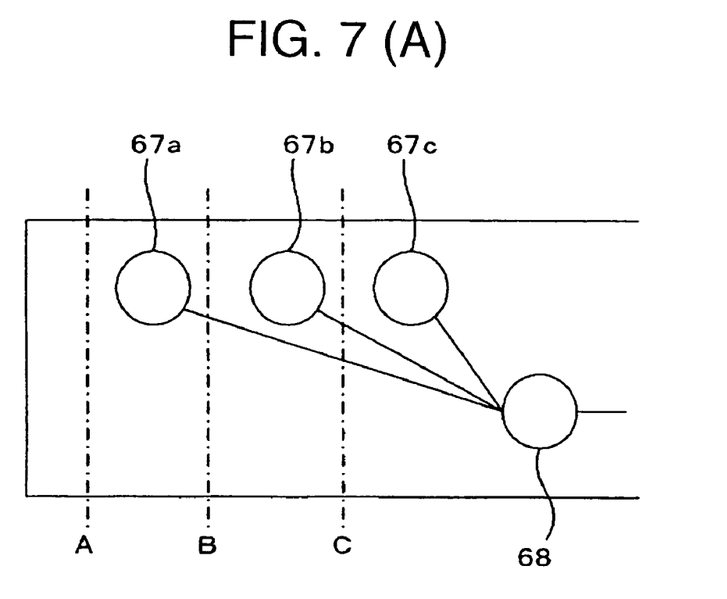
Figure 8:
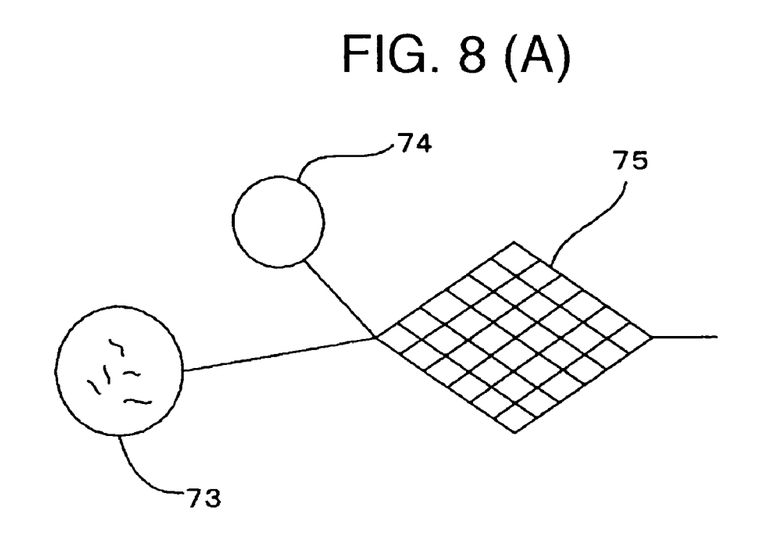

FIGS. 4, and 5 are views each showing a construction of a mixing part by way of example.

As shown in FIG. 4(A), baffles 46 may be provided in a flow path of the mixing part 45 to create a complex streaming movement of substances held in wells 43, 44, respectively, to thereby implement mixing therebetween.

Further, as shown in FIGS. 4B, and 4C, the mixing part may be made up such that wells and flow paths are alternately linked with each other, respectively. FIG. 4(B) is a plan view of the cartridge, and FIG. 4(C) is a sectional view taken on line IVc-IVc of FIG. 4(B). With this working example, wells 49A, and 49B are disposed in three-dimensions, and flow paths 50 each interconnect the wells 49A, and the wells 49B, respectively. Substances held in wells 47, 48, respectively, are mixed together while sequentially passing through the respective wells 49A, the respective flow paths 50, and the respective wells 49B.

In the case of the flow path interconnecting the respective wells in this manner, if the flow path is excessively small in width or diameter, this will cause formation of laminar flows, resulting in deterioration of mixing efficiency. If the flow path has a width 200 µm or less, the laminar flows will occur depending on viscosity of the substances contained, for example, in the case of the viscosity of the substances contained being substantially equivalent to that for water, so that the flow path is preferably formed so as to be over 200 µm in width or diameter.

With the working example shown in FIG. 5(A), a mixing part 53 is made up in the form of a mesh of flow paths. In this case, mixing of substances held in wells 51, 52, respectively, proceeds every time the substances pass through respective intersections of the mesh of the flow paths. The mesh of the flow paths may be made up either two-dimensionally, or three-dimensionally.

With the working example shown in FIG. 5(B), there is shown a case where mixing is executed by use of beads or a mesh filter. In this case, substances held in wells 55, 56, respectively, are guided into a well 57. The well 57 is filled up with beads or a mesh filter 58, and mixing of the substances held in the wells 55, 56, respectively, proceeds every time the substances pass through a gap between the respective beads or a mesh filter 58. A mixture thus produced is discharged via a flow path 59.

A construction of the mixing part is selected as appropriate according to viscosity and fluidity of the substances held in the wells 55, 56, respectively.

The cartridge according to the invention can be used in the case of mixing fine particles with a fluid. With the chemical reaction cartridge according to the working example shown in FIG. 6(A), a well 60 holds a substance having fluidity, and a well 61 holds fine particles 62, respectively In this case, the fine particles 62 can be mixed with a fluid by causing the fluid to be transferred from the well 60 toward the well 61.

The cartridge according to the invention is not limited in application to the case of mixing substances that mutually undergo chemical reaction with each other.

With the chemical reaction cartridge according to the working example shown in FIG. 6(B), a well 64 holds catalysts 65. Upon a substance held in a well 63 being guided to the well 64, the substance held in the well 63 comes into contact with the catalysts 65, whereupon a predetermined chemical reaction occurs. A reaction product or the substance in the middle of the chemical reaction is transferred toward a well 66. As to a state in which the catalysts are held in the well 64, any suitable state can be adopted provided that the catalysts can exhibit a catalysis function. The catalysts may be securely held onto a predetermined site of the cartridge, for example, the wall face of the well, and so forth. Further, if the cartridge is made up by use of an optical transmission material, photo-catalysts can be held in the well.

Further, enzyme in place of the catalysts may be contained in the cartridge to thereby cause the enzyme to react against substrate that is the substance contained.

FIG. 7(A) shows the working example of the cartridge, capable of adjusting a usable quantity of substances contained therein. In FIG. 7A, an identical substance is held in wells 67a, 67b, and 67c, respectively. With this working example, the usable quantity of the substances can be adjusted according to a transfer range of a roller. If the roller is driven by starting, for example, from a position A, the aggregate of the quantities of the substances held in the wells 67a, 67b, and 67c, respectively, is transferred to a well 68 to be thereby used. If the roller is driven by starting from a position B, the aggregate of only the quantities of the respective substances held only in the wells 67b, and 67c is used. Further, if the roller is driven by starting from a position C, the quantity of the substance held only in the well 67c is used. Thus, the cartridge according to the invention can be made up in such a way as to enable only a portion of the substances contained to be used.

Further, in FIG. 7(A), if substances differing in kind from each other are held in the wells 67a, 67b, and 67c, respectively, it is possible to vary the kind of the substance that is put to use according to a drive range of the roller.

As shown in FIG. 7(B), it is possible to vary the kind or quantity of the substances in use by installing a plurality of wells along a direction orthogonal to a drive direction of the roller. With this working example, in the case of a roller 71 being driven on a side of the cartridge, for example, adjacent to a well 69a, only a substance held in the well 69a is guided to a well 70. Meanwhile, in the case of the roller 71 being driven on a side of the cartridge, adjacent to a well 69b, only a substance held in the well 69b is guided into the well 70.

The cartridge according to the invention can also hold cells or bacteria, in cultured state. With the working example shown in FIG. 8(A), a cell culture chamber 73 is formed inside the cartridge. Further, a dissolution liquid for dissolving cell membranes is held in a well 74. By mixing cells in the chamber 73 with the dissolution liquid in the well 74 in a mixing part 75, it is possible to extract substances in the respective cells, for example, protein, magnetic particles, and so forth. If a function for analyzing the substances is provided in the cartridge, processing up to analysis of the substances can be continuously carried out.

Further, the cartridge according to the invention can be applied to a multistage reaction series. With the working example shown in FIG. 8(B), substances held in wells 76, 77, respectively, are mixed in a mixing part 78, and subsequently, a mixture thus produced is merged with a substance held in a well 79 to be thereby mixed together in a mixing part 80. If the well 79 holds, for example, a reaction-stop agent or a quencher, this will enable reaction of the mixture produced in the mixing part 78 to be stopped, or the mixture to undergo deactivation. Mixing in the mixing part 80 is carried out at a suitable time in a stage of reaction stoppage or according to timing for causing the deactivation.

Further, the multistage reaction series can include a reverse transcription reaction. For example, mRNA is held in the well 76, reverse transcriptase is held in the well 77, and RNA lytic enzyme is held in the well 79, respectively. In this case, the mRNA and the reverse transcriptase are mixed with each other in the mixing part 78 to thereby synthesize cDNA having base sequence complementary to the mRNA. Thereafter, the RNA lytic enzyme is added to the cDNA at a suitable time to be mixed together in the mixing part 80, whereupon an unnecessary portion of the mRNA undergoes decomposition, and the cDNA is taken out.

With the cartridge according to the invention, the substances contained therein can be mixed and discharged in short time. Accordingly, the cartridge according to the invention is suited for use in the case requiring make up fresh when the cartridge is put to use. The case requiring the make up fresh when the cartridge is put to use can include, for example, the following.

(1) Curing Reaction

As shown in the cases of the working examples described in the foregoing, the cartridge according to the invention can be widely used in the case requiring make up fresh when the cartridge is put to use, including the case of mixing a monomer with a polymerization initiator, and addition of a polymerization promoter, and so forth. As in the case of producing acrylamido gel, acrylamide can be mixed with a polymerization initiator, and further, a polymerization promoter is added to a mixture thereof.

(2) Reaction Series Unstablized after Reaction

As a procedure for detection of cyanide, the make up fresh when the cartridge is put to use is required, including, for example, a pyridine pyrazolone method (a diffusion process). Although pyridine used in this method evolves malodor, and has toxicity, use of the cartridge enables the hermetically sealed condition thereof to be maintained, thereby ensuring safety.

Further, since an acid phosphatase detection reagent (SM reagent) is unstable against heat and light, the make up fresh when the cartridge is put to use is considered preferable.

Still further, the cartridge according to the invention is suited for use in the case of preparing a reaction product undergoing deactivation early on at the time when the cartridge is put to use. For example, in the case of cell culture, it is possible to prepare a reagent maintaining a specific chromosome at the time when the cartridge is put to use.

(3) A Case where Difficulties are Encountered in Mixing

In the case of a biotechnological experiment, difficulties with mixing two substances with each other are generally perceived, and techniques for mixing are generally required as the basic factor of the experiment (Non-patent Document; for example, "Basic Q and A on Bio-experiment" by Michiei Ofuji, 2001, published by Yodo Co. Ltd., pp. 62 to 63, p. 167). With the cartridge according to the invention, a mixing condition is pre-designed owing to the constructions of the mixing part, and so forth, so that mixing on a predetermined condition can be stably implemented by a simple operation. For this reason, the cartridge according to the invention is effectively applicable to even a situation where there exist difficulties with mixing. In the case of mixing by use of microtubes, there occurs personal difference included in the result of mixing, however, this does not occur with the use of the cartridge according to the invention. For example, mixing enzyme and other components in a PCR reaction, and other molecular-biological reactions can be stably carried out.

(4) A Case where Deterioration and so Forth Occur after Mixing

In the case where there occur inactivation and degradation early on after mixing, the make up fresh when the cartridge is put to use is required. Further, the make up fresh when the cartridge is put to use is also required in the case where it s desired to prevent proliferation of bacteria contamination after mixing. The make up fresh of pharmaceuticals, in particular, when the cartridge is put to use, is widely required. For example, a medicine, such as Peguintron (trade name) as a therapeutic reagent for hepatitis, and so forth, need be used immediately after dissolution, and is prohibited from frothing up upon dissolution.

Further, since a Silver stain solution for detection of protein has a possibility of generating explosive silver amide if the former is left standing, the make up fresh of the same, when the cartridge is put to use, is required, and after use, HCl or NaCl, and so forth are added to the same to be thereby turned into precipitates of AgCl. Further, because the Silver stain solution, if held in such a condition as mixed with a reagent, has a possibility of explosion, mixing need be carried out immediately before the cartridge is put to use.

The cartridge according to the invention is suited for use in such a case as well. In the case of using a syringe in administering a medicine, if the cartridge is made up so as to be integral with the syringe, this will eliminate the necessity of taking the medicine out of the cartridge.

(5) A Case where Substances have Toxicity and Hazards Prior to Reaction

With the cartridge according to the invention, a fluid and fine particles, prior to reaction, are contained inside the cartridge. Accordingly, the fluid and fine particles that are noxious or hazardous can be handled with the use of the cartridge.

For example, detecting solution for western blotting contains carcinogen, however, airtightness can be maintained if the cartridge is used, so that safety can be ensured.

As described in the foregoing, the chemical reaction cartridge according to the invention has the construction capable of predetermining the chemical reaction condition, so that the predetermined chemical reaction can be rapidly and stably applied. Further, since the substances contained therein are held in the hermetically sealed condition, it is possible to ensure safety prior to, and during usage of the cartridge. Still further, since post-reaction of the cartridge is completed simply by disposing of the same, there will be no need for an operation for cleaning an instrument, and so forth.

It is to be pointed out, however, that the present invention is not limited in scope of application to the working examples described hereinbefore. The present invention can be widely used in the case of executing a chemical reaction without limitation owing to the content of the chemical reaction.

What is claimed is:

1. A chemical reaction cartridge capable of causing deformation to occur thereto upon application of an external force thereto, and transferring substances contained therein to thereby apply a chemical reaction, said cartridge comprising:
    an elastic member,
    a substrate,
    a plurality of holding parts for holding the substances in a hermetically sealed condition, said plurality of holding parts being formed as recesses in said elastic member;
    a mixing part for mixing the substances with each other in accordance with the deformation of the cartridge; and
    a discharge part for discharging a mixture produced in the mixing part to the outside of the cartridge, in accordance with the deformation of the cartridge.

2. A chemical reaction cartridge according to claim 1, wherein the mixing part has a plurality of intersections where the substances contained cross each other.

3. A chemical reaction cartridge according to claim 1, wherein the mixing part comprises a plurality of wells, and flow paths interconnecting the wells, respectively.

4. A chemical reaction cartridge according to claim 1, wherein the mixing part includes beads or a mesh filter.

5. A chemical reaction cartridge according to claim 1, wherein substances contained in the cartridge are transferred in one direction by deformation of the cartridge upon application of the external force, thereby mixing and discharging the substances.

6. A chemical reaction cartridge according to claim 1, wherein said mixing part includes:
    a first mixing part for mixing first and second substances contained in the cartridge, respectively, in a hermetically sealed condition, with each other, in accordance with deformation of the cartridge, and
    a second mixing part for mixing a mixture produced in the first mixing part with a third substance contained in the cartridge, in a hermetically sealed condition, in accordance with the deformation of the cartridge.

7. A method of using a chemical reaction cartridge, said method comprising:
    providing the chemical reaction cartridge having an elastic member, a substrate, a plurality of holding parts for holding the substances in a hermetically sealed condition, the plurality of holding parts being formed as recesses in said elastic member, a mixing part for mixing the substances with each other in accordance with the deformation of the cartridge, and a discharge part for discharging a mixture produced in the mixing part to the outside of the cartridge, applying an external force to the cartridge to thereby deform the cartridge and transfer the substances from said plurality of holding parts to said mixing part, mixing the substances in the mixing part, and discharging the substances from the cartridge.

8. A method of using a chemical reaction cartridge according to claim 7, further comprising:

disposing of the cartridge after mixing the substances.

9. A method of using a chemical reaction cartridge according to claim 8, wherein a reagent is produced during the mixing of the substances, and wherein the reagent is made up fresh when the cartridge is used.

10. A method of using a chemical reaction cartridge according to claim 8, wherein during the mixing the substances held in the respective holding parts, a chemical reaction on the substances is started or promoted.

11. A method of using a chemical reaction cartridge according to claim 8, wherein during the mixing the substances held in the respective holding parts, the substances are brought into contact with catalysts.

12. A method of using a chemical reaction cartridge according to claim 8, wherein the substances are an enzyme and a substrate, and wherein during the mixing the substances held in the respective holding parts, the substances are brought into contact with each other.

13. A method of using a chemical reaction cartridge according to claim 8, wherein during the mixing the substances held in the respective holding parts, a detection medicine is prepared.

14. A method of using a chemical reaction cartridge according to claim 8, wherein during the mixing the substances held in the respective holding parts, a reagent for cell culture is prepared.

15. A method of using a chemical reaction cartridge according to claim 7, wherein one of said plurality of holding parts is a culture chamber for cells or bacteria, and wherein substances in the cells or bacteria are extracted during the mixing of the substances.

16. A method of using a chemical reaction cartridge according to claim 9, wherein the reagent is one of (i) a mixture of a monomer and a polymerization initiator, (ii) a mixture of a monomer and a polymerization promoter, or (iii) a therapeutic reagent.

17. A method of using a chemical reaction cartridge according to claim 16, wherein the monomer is acrylamide.

18. A method of using a chemical reaction cartridge according to claim 9, wherein the reagent is a reagent having toxicity, hazards, explosiveness, or carcinogenicity.

19. A method of using a chemical reaction cartridge according to claim 18, wherein the reagent is a Western blotting detection liquid.

20. A method of using a chemical reaction cartridge according to claim 18, wherein the reagent is a silver staining liquid.

21. A method of using a chemical reaction cartridge according to claim 13, wherein the detection medicine is a cyanide detection reagent or an acid phosphatase detection reagent.

22. A chemical reaction cartridge capable of causing deformation to occur thereto upon application of an external force thereto, and transferring substances contained therein to thereby apply a chemical reaction, said cartridge comprising:

an elastic member, a substrate, a holding part which includes a fluid, a mixing part which includes fine particles, and a discharge part for discharging a mixture of the fluid and fine particles to the outside of the cartridge, in accordance with the deformation of the cartridge, wherein the mixture of the fluid and the fine particles is discharged from the discharge part upon application of the external force, wherein said holding part and said mixing part are formed as recesses in said elastic member; and wherein upon application of the external force, the fluid is transferred from said holding part to said mixing part, such that the fluid and fine particles are mixed together.

23. A method of using a chemical reaction cartridge according to claim 7, wherein said plurality of holding parts hold a fluid, wherein said mixing part holds fine particles, and wherein upon application of the external force, the fluid is transferred from said plurality of holding parts to said mixing part, such that the fluid and fine particles are mixed together.

* * * * *